(12) United States Patent
Rai et al.

(10) Patent No.: US 10,445,679 B2
(45) Date of Patent: Oct. 15, 2019

(54) LABOR FLEXIBILITY ASSESSMENT SYSTEM FOR A DOCUMENT MANAGEMENT SYSTEM

(71) Applicant: Conduent Business Services, LLC, Florham Park, NJ (US)

(72) Inventors: Sudhendu Rai, Fairport, NY (US); Ranjit Kumar Ettam, Pradesh (IN)

(73) Assignee: Conduent Business Services, LLC, Florham Park, NJ (US)

( * ) Notice: Subject to any disclaimer, the term of this patent is extended or adjusted under 35 U.S.C. 154(b) by 787 days.

(21) Appl. No.: 15/093,196

(22) Filed: Apr. 7, 2016

(65) Prior Publication Data
US 2017/0293875 A1 Oct. 12, 2017

(51) Int. Cl.
| | |
|---|---|
| *G06Q 10/00* | (2012.01) |
| *G06Q 10/06* | (2012.01) |
| *G06Q 10/10* | (2012.01) |
| *G06F 3/12* | (2006.01) |
| *G06F 16/20* | (2019.01) |
| *G06Q 30/02* | (2012.01) |
| *G06F 17/28* | (2006.01) |
| *G06N 20/00* | (2019.01) |
| *G06Q 10/04* | (2012.01) |

(52) U.S. Cl.
CPC ......... *G06Q 10/067* (2013.01); *G06F 3/1285* (2013.01); *G06F 3/1288* (2013.01); *G06F 16/20* (2019.01); *G06F 17/289* (2013.01); *G06Q 10/063* (2013.01); *G06Q 10/06315* (2013.01); *G06Q 10/10* (2013.01); *G06Q 30/0202* (2013.01); *G06N 20/00* (2019.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 6,509,974 B1 * | 1/2003 | Hansen | ................. | G06F 3/1205 358/1.12 |
| 7,162,427 B1 * | 1/2007 | Myrick | ................. | G06Q 10/06 705/348 |
| 7,805,382 B2 * | 9/2010 | Rosen | ................ | G06Q 10/1053 705/321 |
| 7,970,729 B2 * | 6/2011 | Cozzi | .................... | G06F 16/288 707/601 |
| 8,060,394 B2 * | 11/2011 | Woodings | .............. | G06Q 10/06 705/7.13 |
| 8,144,364 B2 * | 3/2012 | Rai | ........................ | G06Q 10/06 358/1.9 |

(Continued)

*Primary Examiner* — Gurkanwaljit Singh
(74) *Attorney, Agent, or Firm* — Fox Rothschild LLP

(57) ABSTRACT

A system for determining a labor flexibility level for a document management system that meets a performance level of a full-flexibility level and is within one or more threshold limits includes a document management system having a plurality of print production devices, an electronic device in communication with the document management system, and a computer-readable storage medium having one or more programming instructions. The document management system is associated with a plurality of operators who each possess one or more skill sets for operating one or more of the print production devices.

12 Claims, 8 Drawing Sheets

(56) References Cited

U.S. PATENT DOCUMENTS

| | | | |
|---|---|---|---|
| 8,660,876 B2 * | 2/2014 | Woodings | G06Q 10/06 705/7.13 |
| 2003/0225607 A1 * | 12/2003 | Kopunovic | G06Q 10/06311 705/7.13 |
| 2004/0267595 A1 * | 12/2004 | Woodings | G06Q 10/06 705/7.14 |
| 2006/0080134 A1 * | 4/2006 | Toomey | G06Q 10/1053 705/321 |
| 2006/0106825 A1 * | 5/2006 | Cozzi | G06F 16/288 |
| 2006/0229896 A1 * | 10/2006 | Rosen | G06Q 10/10 705/321 |
| 2006/0250636 A1 * | 11/2006 | Richards | G06F 3/1208 358/1.15 |
| 2007/0203778 A1 * | 8/2007 | Lowson | G06Q 10/06 705/7.14 |
| 2008/0120129 A1 * | 5/2008 | Seubert | G06Q 10/06 705/35 |
| 2008/0231868 A1 * | 9/2008 | Onsen | G06F 3/1204 358/1.1 |
| 2009/0021774 A1 * | 1/2009 | Rai | G06Q 10/06 358/1.15 |
| 2010/0037285 A1 * | 2/2010 | Cain | G06F 3/121 726/1 |
| 2010/0211515 A1 * | 8/2010 | Woodings | G06Q 10/06 705/320 |
| 2012/0053976 A1 | 3/2012 | Hu et al. | |
| 2013/0278963 A1 * | 10/2013 | Hoarau | G06Q 10/06 358/1.15 |
| 2014/0039956 A1 * | 2/2014 | Cicio, Jr. | G06Q 10/063112 705/7.14 |
| 2014/0156686 A1 * | 6/2014 | Woodings | G06Q 10/06 707/756 |

* cited by examiner

LABOR FLEXIBILITY ASSESSMENT SYSTEM FOR A DOCUMENT MANAGEMENT SYSTEM

BACKGROUND

Print production environments, such as print shops, often experience high variability in job volume, job mix, job arrivals, labor skills and equipment. This variability tends to pose challenges to the production environment achieving optimal utilization of resources and performance.

In an effort to mitigate the effects of variability in a production environment, operators of a production environment may be cross-trained to handle different tasks, which may provide the production environment with labor flexibility. While cross training operators has shown significant improvement in operations, a tradeoff exists between the level of flexibility in the system and the associated cost of operations.

Currently, labor cross-training in many production environments is performed manually and ad hoc, which results in high training costs and poor labor operating conditions.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. As used herein, the term "comprising" means "including, but not limited to."

In an embodiment, a system for determining a labor flexibility level for a document management system that meets a performance level of a full-flexibility level and is within one or more threshold limits includes a document management system having a plurality of print production devices, an electronic device in communication with the document management system, and a computer-readable storage medium having one or more programming instructions. The document management system is associated with a plurality of operators who each possess one or more skill sets for operating one or more of the print production devices.

The system identifies a fully-flexible configuration of the document management system as a current configuration. The fully-flexible configuration represents a configuration where each of the plurality of operators possesses every skill set necessary to operate each print production device. The system determines a performance level value for the current configuration, and identifies a set of possible configurations of the document management system. Each possible configuration represents a configuration where one or more of the plurality of operators possesses fewer than every skill set. For each possible configuration in the set, the system selects a possible configuration from the set, determines whether the selected possible configuration should replace the current configuration based on the performance level value associated with the current configuration, a performance level value associated with the selected possible configuration, and a performance threshold limit, in response to determining whether the selected possible configuration should replace the current configuration, replaces the current configuration with the selected possible configuration, and presents to a user the current configuration as a recommended configuration for the document management system. The current configuration indicates which operators should be cross-trained with which skill sets.

Optionally, the system may determine a fully-flexible performance level value for the fully-flexible configuration by performing a simulation of an operation of the current configuration using at least a portion of historical print job information.

The system may determine whether the selected possible configuration should replace the current configuration by determining the performance value associated with the selected possible configuration, identifying the performance threshold limit that represents a threshold value of one or more performance parameters, and determining whether the performance value associated with the selected possible configuration does not exceed a sum of the performance level value associated with the current configuration and the performance threshold limit.

The system may, in response to determining that the performance value associated with the selected possible configuration does not exceed a sum of the performance level value associated with the current configuration and the performance threshold limit, determine a cross-training cost associated with the current configuration, determine a cross-training cost associated with the selected possible configuration, determine a difference between the cross-training cost associated with the selected possible configuration and the cross-training cost associated with the current configuration, and in response to the difference being less than zero, determine that the selected possible configuration should replace the current configuration.

The system may determine a cross-training cost associated with the current configuration by performing a simulation of an operation of the current configuration using at least a portion of historical print job information. The system may determine a cross-training cost associated with the selected possible configuration by performing a simulation of an operation of the selected possible configuration using at least a portion of historical print job information.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "document management system" refers to a system of print production devices that are configured to collectively perform multiple print jobs, along with the associated infrastructure (such as buildings and power systems) and personnel required to house and operate the print production devices.

A "job" refers to a logical unit of work that is to be completed by a production environment.

A "job function" refers to one or more processing steps associated with processing a job. In a document management system, a "print job function" refers to one or more processing steps associated with processing a print job. Example print job functions may include, without limitation, printing, binding, collating, scanning and/or the like.

An "operator" refers to someone who possesses the necessary skills to operate one or more production devices and/or perform one or more job functions.

A "print job" refers to a job processed in a document management system such as a print shop.

A "print production device" refers to a type of production device used to process at least a portion of a print job. Examples of print production devices may include, without limitation, printers, inserters, binders, punchers, collators, multi-function devices or other similar equipment and/or the like.

A "production device" refers to a device used to process at least a portion of a job.

A "skill" or "skill set" refers to one or more abilities to perform one or more job functions, or to operate one or more production devices to perform one or more job functions.

Figure 1:
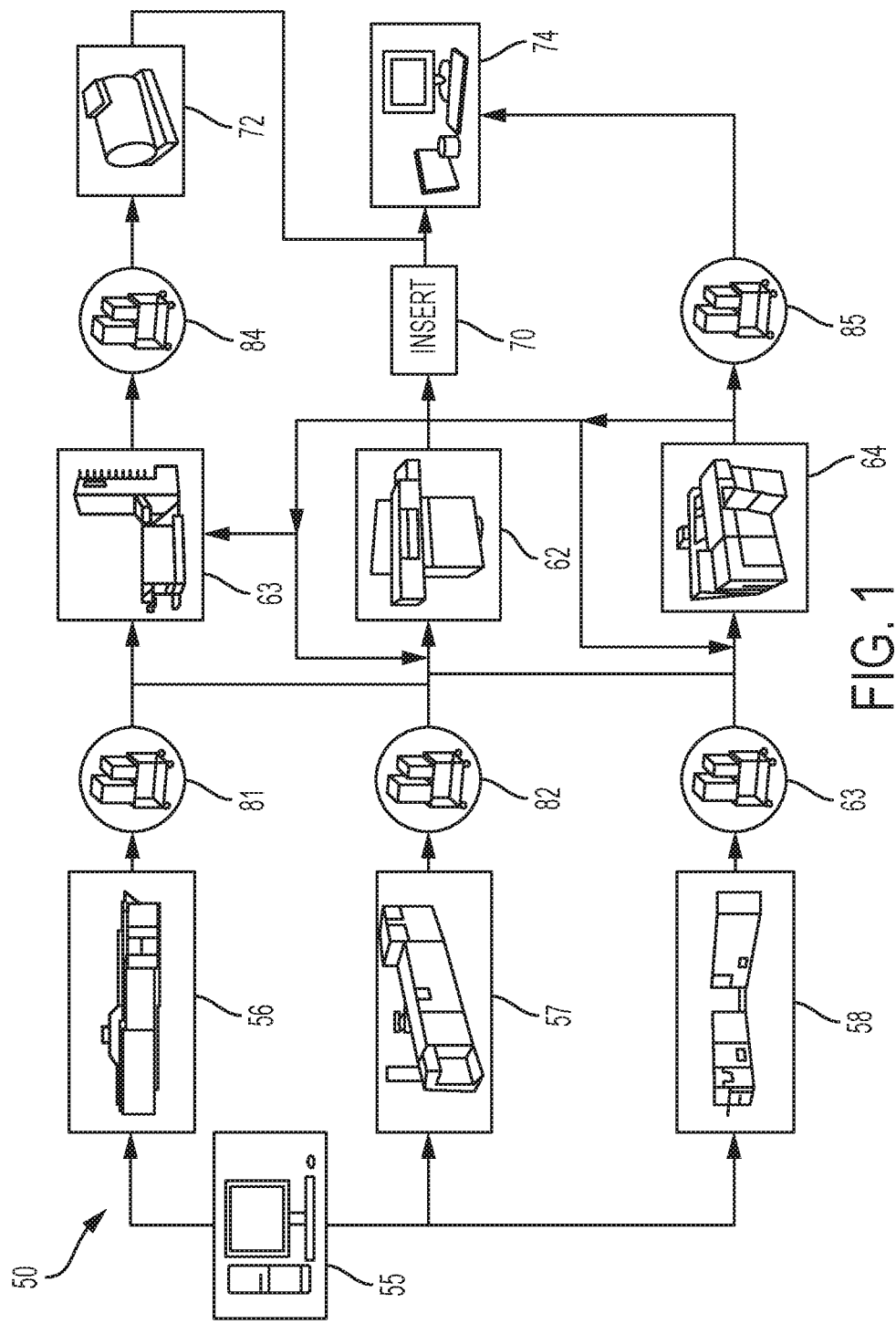
FIG. 1 illustrates an example production environment according to an embodiment.

FIG. 1 shows an example of a production environment 50, in this case, example elements of a document management system or print shop, according to an embodiment. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
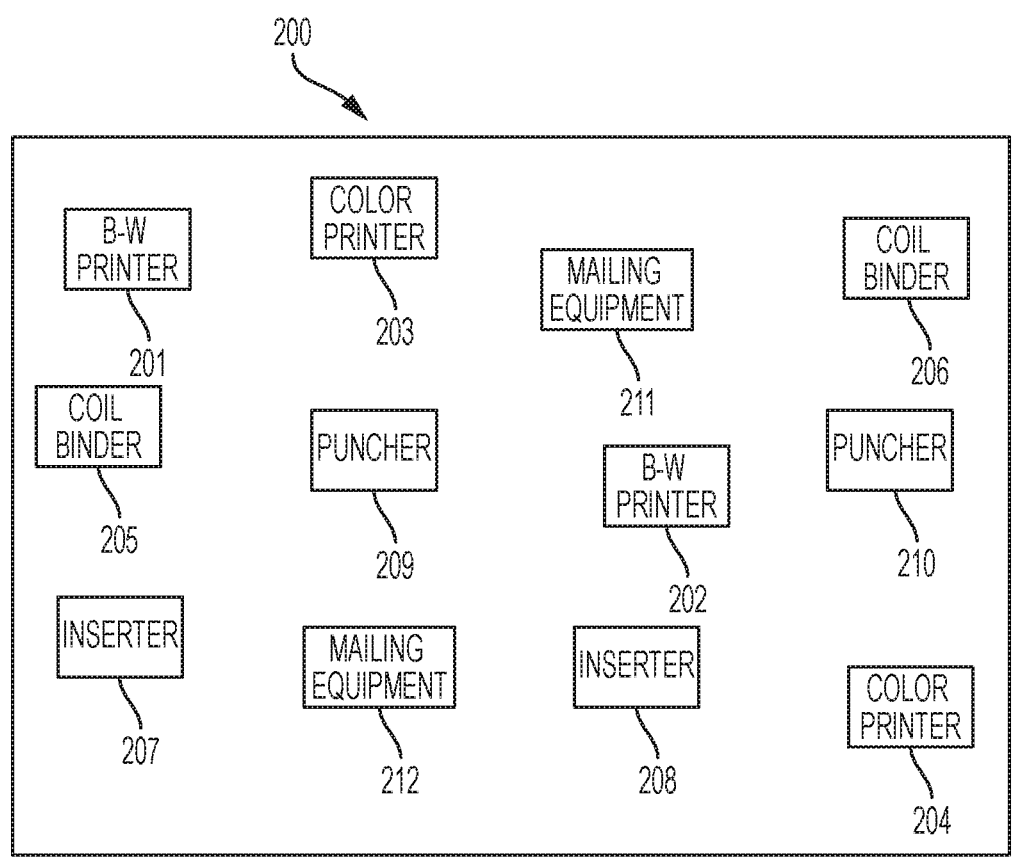
FIG. 2 illustrates an example document management system according to an embodiment.

FIG. 2 illustrates an example document management system according to an embodiment. As illustrated by FIG. 2, a document management system 200 includes two black-and-white printers 201, 202, two color printers 203, 204, two coil binders 205, 206, two inserters, 207, 208, two punchers 209, 210, and two sets of mailing equipment 211, 212.

Figure 3:
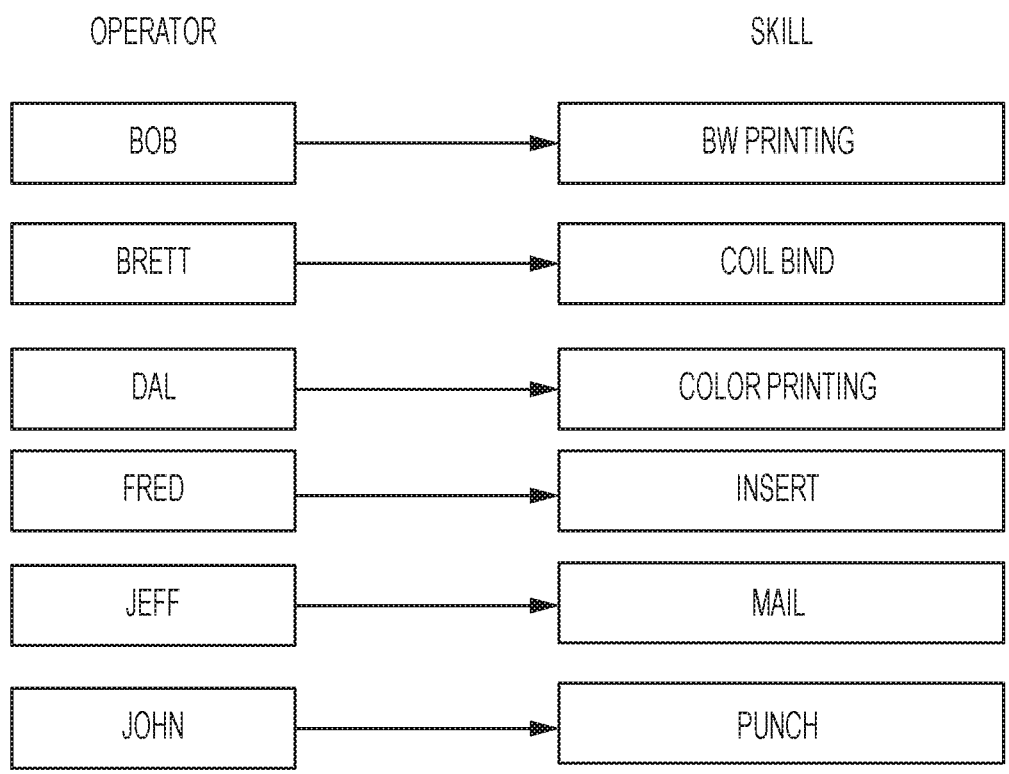
FIG. 3 illustrates an example mapping of operators and skill sets according to an embodiment.

As an example, there may be six operators and six skill sets associated with the document management system depicted in FIG. 2. FIG. 3 illustrates an example mapping of operators and skill sets for the document management system of FIG. 2 when the document management system does not have flexibility according to an embodiment. As shown by FIG. 3, each operator is only capable of performing one skill set, which provides for little labor flexibility. As such, the training costs are at their lowest, but the performance of the production environment is at its worst.

But each operator may be cross-trained with one or more other skill sets. For instance, in this example, there are 2^25 different skill set and operator combinations. However, cross-training operators results in an increased cost. For example, Table 1 illustrates example costs of cross-training the operators of FIG. 3 in alternate skill sets according to an embodiment.

TABLE 1

| Skill | Cost of training ($) | | | | | |
|---|---|---|---|---|---|---|
| | Bob | Brett | Dal | Fred | Jeff | John |
| BW Printing | N/A | 550 | 430 | 580 | 575 | 600 |
| Coil Binding | 350 | N/A | 320 | 350 | 325 | 350 |
| Color Printing | 450 | 575 | N/A | 600 | 590 | 625 |
| Insert | 320 | 300 | 310 | N/A | 290 | 325 |
| Mail | 300 | 280 | 290 | 280 | N/A | 190 |
| Punch | 350 | 340 | 300 | 280 | 285 | N/A |

Figure 4:
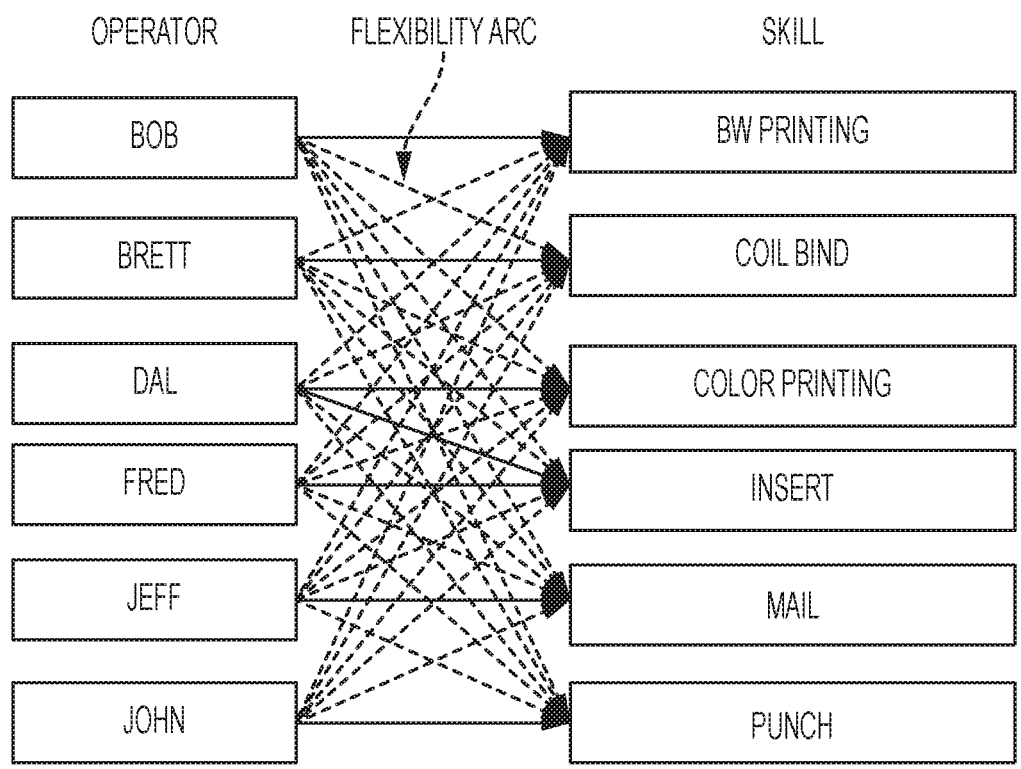
FIG. 4 illustrates a depiction of an example full flexibility system according to an embodiment.

In comparison to FIG. 3, FIG. 4 illustrates a depiction of a full flexibility system where each operator is cross-trained with all of the skill sets, the training costs are the highest, and the performance of the production environment is at its best.

In an embodiment, an electronic device may perform an automated simulation to determine a labor flexibility level for a production system that meets the performance level of full flexibility system within user specified threshold limits. The problem to be addressed may be represented as follows:

Minimize $CTC(\theta): \Sigma_{j=1}^{m} \Sigma_{i=1}^{n} C_{ij} y_{ij}$ $\forall i=1,2,\ldots,n$, $j=1,2,\ldots,m$ Subject to:

$f(\theta) \leq \xi + \tau$ $\theta = \lfloor y_{ij} \rfloor$ $\forall i=1,2,\ldots,n, j=1,2,\ldots,m$ $\lfloor y_{ij} \rfloor \in \{0,1\}$ $\forall i=1,2,\ldots,n, j=1,2,\ldots,m$ Where:
i=index of operator
j=index of skill
n=number of operators
m=number of different skills
$C_{ij}$=the cost of training an $i^{th}$ operator with $j^{th}$ skill
$y_{ij}$=a binary variable indicating "1" if a connection from i to j exists, "0" otherwise
θ=vector of $y_{ij}$ values (i.e., vector of operator skill mappings)
f(θ)=performance of production environment at θ operator skill design ξ=performance of a full flexibility system
τ=user specified threshold value limit on performance level The above described problem can be difficult to solve for a variety of reasons. For example, evaluating the performance of the production environment at different operator flexibility levels can be complex. Also, there are several possible combinations of operators and skills, and to determine a desired flexibility level is a non-deterministic polynomial-time (NP) hard problem.

In an embodiment, an approach may be used to solve the large scale constrained simulation optimization problem described above. The approach may utilize simulated annealing, and may begin with a fully-flexible system. Cross-training costs and performance may be evaluated using simulation. The simulation may use a temperature parameter, which at the start of the simulation, may have a high value. Systematically, the temperature may be reduced until one or more termination conditions are met. A system may search for a solution by decreasing the temperature cooling and a feasibility of an intermediate solution may be determined by comparing the solution with the performance of a fully flexibility system and a performance threshold limit. In an embodiment, a performance threshold limit may be a threshold limit on one or more parameters of performance of a production environment. For instance, if performance of a document management system is measured in number of late print jobs, and the performance of a full flexibility system is currently at zero late print jobs, a threshold limit specified by a user may be 4 print jobs—indicating that a result that yields greater than 4 late print jobs will not be feasible. In certain embodiments, a threshold limit may be specified by a user of the system. Additional and/or alternate performance metrics may be used within the scope of this disclosure.

Figure 5A:
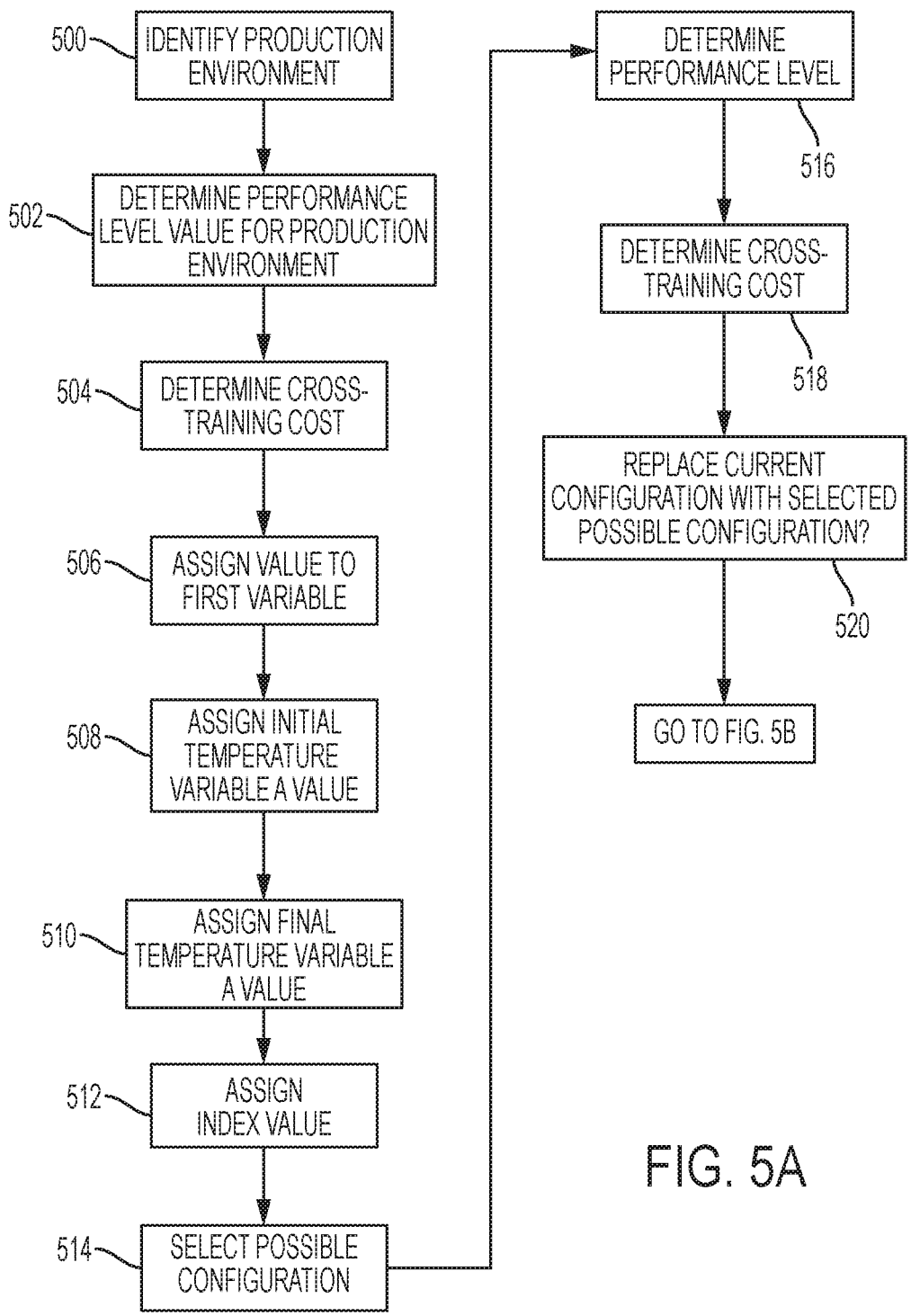
FIGS. 5A and 5B illustrate a flow chart of an example method of evaluating performance and cross-training cost for a production environment according to an embodiment.
Figure 5B:
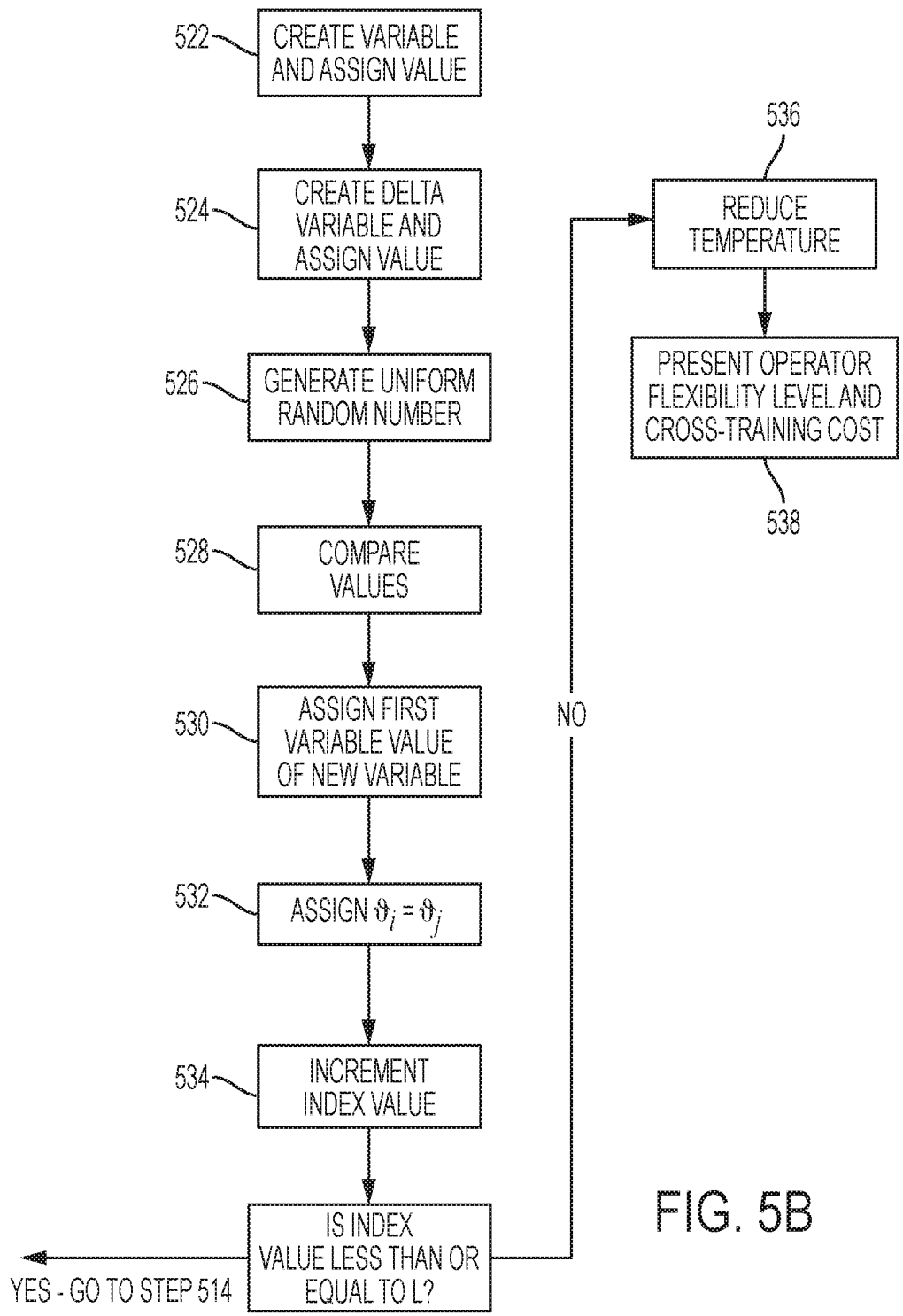

FIGS. 5A and 5B illustrate a flow chart of an example method of determining an optimal labor flexibility level for a production environment according to an embodiment. The term "optimal" should be construed broadly to cover any apparently advantageous arrangement given a set of practical conditions, and should not be construed to imply a mathematically provable optimum.

As illustrated by FIGS. 5A and 5B, an electronic device may identify 500 a production environment to be evaluated, and may identify a fully-flexible version of the production environment as a current configuration of the production environment. The electronic device may determine 502 a performance level value for the identified production environment when it operates as fully-flexible system. An identified production environment may operate as a fully-flexible system when each of the operators of the production environment is cross-trained with all of the skill sets required to operate the production environment, such as, for example, all of the skill sets needed to operate all of the print production devices in a document management system. A performance value may be a measure of performance for the production environment over a period of time such as, for example, number of late jobs, throughput and/or the like.

In various embodiments, an electronic device may determine 502 a performance level value for a current configuration of a production environment by performing a simulation of the operation of the production environment using sample job information such as, for instance, historical job information.

In an embodiment, an electronic device may determine 504 a cross-training cost associated with the current configuration of the production environment. For example, an electronic device may determine 504 a cross-training cost associated with operating an identified production environment as a fully-flexible system by identifying one or more operators who are to cross trained in one or more skills and identifying a cost associated with such cross-training. An electronic device may determine 504 a cross-training cost associated with a production environment by adding up the cross-training cost for each operator in the environment. For instance, Table 2 illustrates a total cross-training cost for cross-training each operator shown in Table 1 with every skill, and a total cost for the environment.

TABLE 2

| Skill | Cost of training ($) | | | | | |
|---|---|---|---|---|---|---|
| | Bob | Brett | Dal | Fred | Jeff | John |
| BW Printing | N/A | 550 | 430 | 580 | 575 | 600 |
| Coil Binding | 350 | N/A | 320 | 350 | 325 | 350 |
| Color Printing | 450 | 575 | N/A | 600 | 590 | 625 |
| Insert | 320 | 300 | 310 | N/A | 290 | 325 |
| Mail | 300 | 280 | 290 | 280 | N/A | 190 |
| Punch | 350 | 340 | 300 | 280 | 285 | N/A |
| Total | 1770 | 2045 | 1650 | 2090 | 2065 | 2090 |
| | | | | | Total | 11,710.00 |

As shown by FIGS. 5A and 5B, an electronic device may create a first value variable, and may assign the first value variable 506 a value equal to a cross-training cost for the current configuration. An electronic device may assign 508 an initial temperature variable a value equal to double the first value variable, and may assign 510 a final temperature variable a value equal to the ratio of the initial temperature variable and a temperature depth. These assignments may be represented as follows:

$$\text{value} = CTC(\theta_k)$$

$$T_{initial} = \text{value} * 2$$

$$T_{final} = \frac{T_{initial}}{T_{depth}}$$

$$T = T_{initial}$$

In an embodiment, an index value, l, may have a value between '1' and 'L' where 'L' represents a number of times to search a neighborhood solution at a given temperature. An index value may be assigned 512 a value of '1'.

An electronic device may identify a set of possible configurations of the production environment. A possible configuration may represent a configuration where one or more operators are not cross-trained with all of the skill sets for the production environment. For instance, a first operator may be trained to operate a printer and a scanner, but a second operator may only be trained to operate a printer. As such, one or more operators may possess fewer than every skill set needed to operate every production device.

An electronic device may select 514 a possible configuration from the set of possible configurations. The electronic device may randomly select 514 a possible configuration in an embodiment.

In an embodiment, an electronic device may determine 516 a performance level of a production environment associated with the selected possible configuration. An electronic device may determine 516 the performance level by performing a simulation of an operation of a production environment having the selected possible configuration using sample job information such as, for instance, historical job information. A performance level may be identified in terms of number of late jobs processed by the production environment over a period of time. For instance, if a production environment processed 10 late print jobs over a one-week period, the performance level for the production environment may be 10 print jobs. As another example, a performance level may be measured in terms of throughput over a period of time. Additional and/or alternate measures of performance may be used within the scope of this disclosure.

The electronic device may determine 518 a cross-training cost associated with a production environment having the selected possible configuration such as, for example, in the manner described above.

An electronic device may determine 520 whether a selected possible configuration is feasible or not. In certain embodiments, a feasible selected possible configuration may replace the current configuration. An electronic device may determine 520 the feasibility of the selected possible configuration by comparing as associated value with the sum of a performance level of a current configuration and a user-specified threshold limit on performance level. If the performance level of the selected possible configuration is less than or equal to a sum of a performance level of a current configuration and a threshold limit on performance level, then the selected possible configuration is feasible. For example, if the performance of the current configuration is 10 late jobs, a threshold limit specified by a user may be 5 print jobs—indicating that any value less than or equal to 15 late jobs for the selected possible configuration will be feasible. If an electronic device determines that a possible configuration is feasible, the electronic device may perform steps 522-534 as described below.

An electronic device may create a new value variable and assign 522 it a cross-training cost for the randomly selected neighborhood design. The system may create a delta variable and assign 524 it a value equal to a difference between the new value variable and the value. The system may generate 526 a uniform random number U such that U~U [0,1].

The system may determine 528 whether the value of the delta variable is less than '0' or whether $$e^{\frac{-delta}{T_{initial}}} \geq U_k.$$

If the system determines that either is true, the system may assign 530 the value variable the value of the new value variable, and may assign 532 $\theta_i = \theta_j$. In other words, an electronic device may update or replace the current configuration with the selected possible configuration.

In an embodiment, the system may increment 534 the index value, and may repeat steps 514-534. The system may repeat steps 514-534 for all values of the index value.

As illustrated by FIGS. 5A and 5B, the system may reduce or update 536 the temperature for the system. The system may reduce or update the temperature for the system by assigning the temperature a value equal to the product of the temperature and a value equal to a temperature decay rate. In an embodiment, the system may reduce or update 536 the value of the temperature until the temperature of the system has a value that is greater than or equal to the value of the final temperature value.

In response to determining that the initial temperature has a value that is greater than or equal to the value of the final temperature value, the system may present 538 $\theta_i$ as the operator flexibility level.

The system may present 538 the value or CTC ($\theta_i$) as the optimal labor cross training cost. The returned optimal operator flexibility level may represent the level of labor flexibility that achieves the benefits of a full flexibility system within the performance threshold limits. The returned optimal labor cross training cost may be the cost for cross-training operators for the returned optimal operator flexibility level.

In various embodiments, the system may present 538 the optimal operator flexibility level and the cross-training cost to a user by causing such information to be displayed on a display device of an electronic device. In other embodiments, the system may present 538 the information via email or as a graphical user interface notification.

The following pseudo-code illustrates the example method of determining the optimal operator flexibility level and total cross-training cost for a production environment as illustrated by FIGS. 5A and 5B.

1. For a full flexibility system ($\theta_i$), evaluate the performance $\xi = f(\theta_i)$ and the total cross-training cost CTC($\theta_i$)

2. $value = CTC\ (\theta_i);\ T_{initial} = value * 2;\ T_{final} = \frac{T_{initial}}{T_{depth}},\ T = T_{initial}$ 3. Repeat:
   3.1 For l = 1, . . . , L
   3.2 Randomly select the neighborhood design $\theta_j$, where $\theta_j \in N(\theta_i)$ and $N(\theta_i)$ is the set of neighborhood of $\theta_i$
   3.3 If $f(\theta_j) \leq \xi + \tau$
     3.3.1 new value = CTC ($\theta_j$)
     3.3.2 delta = new value − first value
     3.3.3 generate uniform random number U~U [0, 1]
     3.3.4 if delta < 0 or $e^{\frac{-delta}{T}} \geq U$, then value = new value
     3.3.5 $\theta_i = \theta_j$
     3.3.6 End If
   3.4 End If
   3.5 Increment l
4. Reduce the temperature: T = r * T until T ≥ $T_{final}$
5. Return $\theta_i$ as the operator flexibility level, and value or CTC ($\theta_i$) as the labor cross-training cost The following illustrates an example of the above approach, according to an embodiment. For purposes of this example, a full flexibility system has a performance value, $\xi$, of 11 jobs, and a cross-training cost, CTC, of $13,210. Table 2 summarizes example simulation results using the following simulated annealing parameters: $T_{depth}$=100, r=0.9, L=5, and $\tau$=4.

TABLE 2

|  | Run 1 | Run 2 | Run 3 | Run 4 | Run 5 |
| --- | --- | --- | --- | --- | --- |
| Number of late jobs | 15 | 14 | 14 | 15 | 12 |
| Total number of jobs arrived | 176 | 176 | 176 | 176 | 176 |

TABLE 2-continued

|  | Run 1 | Run 2 | Run 3 | Run 4 | Run 5 |
|---|---|---|---|---|---|
| Cross-training cost ($) | 4,685 | 5,545 | 4,935 | 4,885 | 5,015 |
| Simulation time (mins) | 9.7 | 9.9 | 9.6 | 9.8 | 10 |

Figure 6:
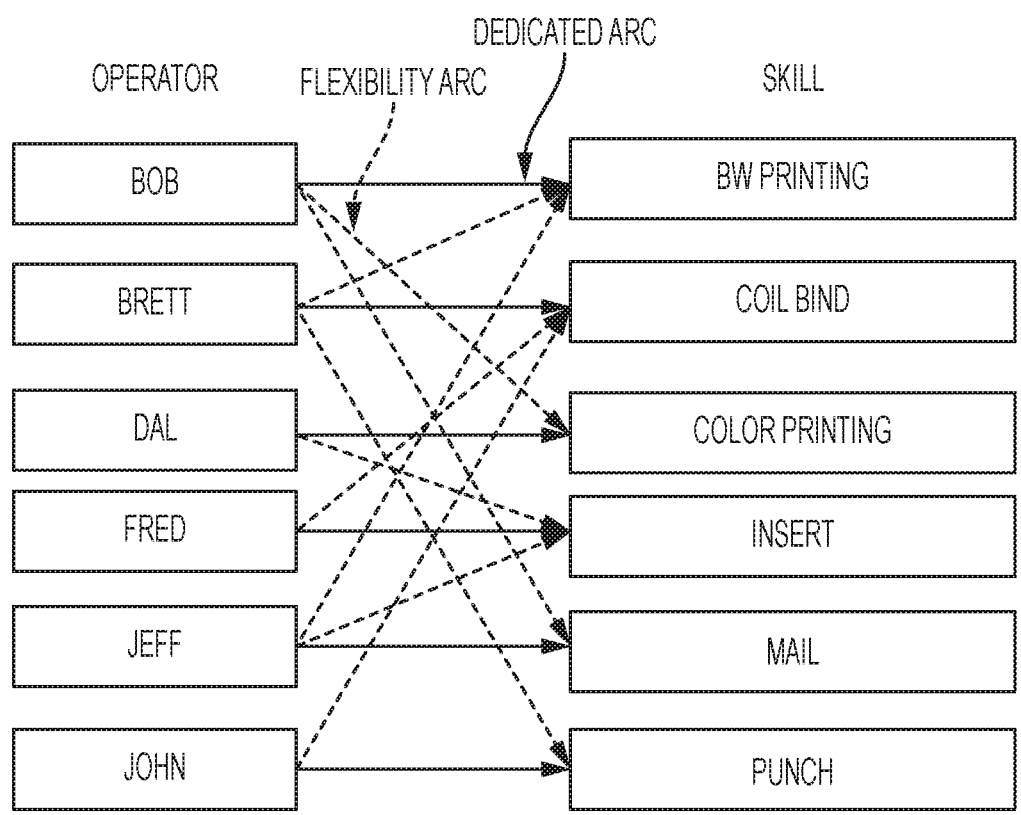
FIG. 6 illustrates an example operator flexibility level according to an embodiment.

FIG. 6 illustrates the returned optimal operator flexibility level for the simulation results illustrated in Table 2 according to an embodiment.

Although the methods and systems of this disclosure are described above in the context of a document management system, they may be applied to other production environments such as automobile manufacturing facilities, fulfillment centers, call centers, and/or the like.

Figure 7:
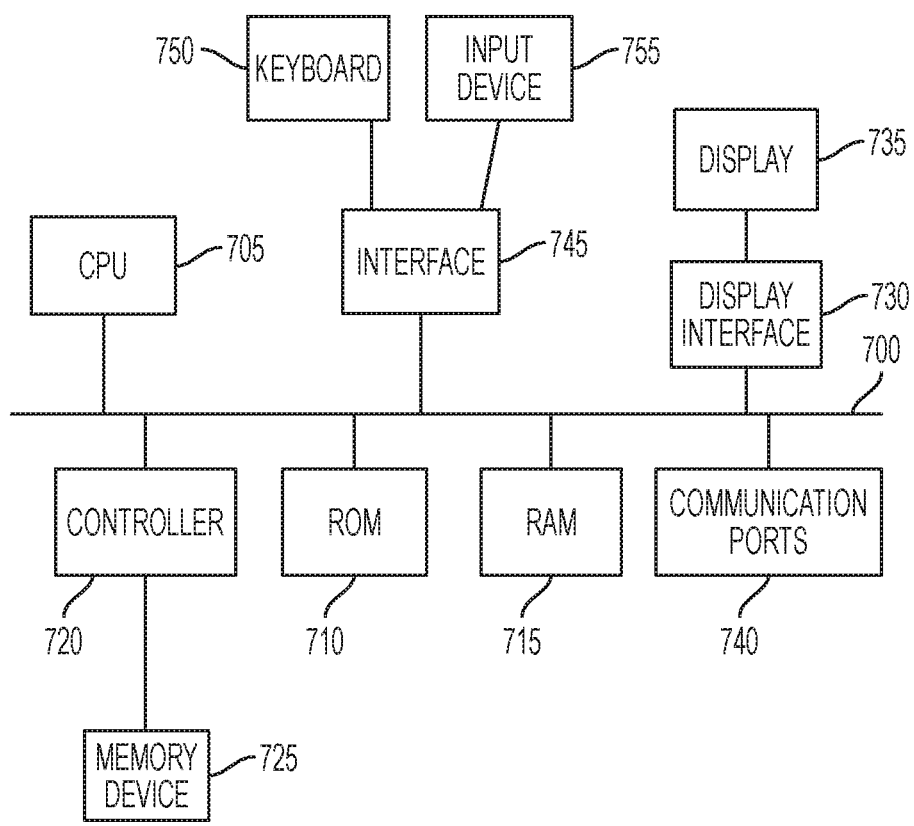
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a production device, computing device or processor as such terms are used within this disclosure.

CPU 705 represents one or more processors that perform calculations and logic operations required to execute a program. Any number of processors may be available, and they may be part of a single electronic device or distributed across any number of networked electronic devices. The processor(s) may access a computer-readable memory device 725 containing programming instructions.

When this document and any claim uses the term "processor," then unless specifically stated otherwise it is intended to refer to all such embodiments (i.e., single processor or multiple processors). When this document or any claim in the document uses the term "computer-readable memory," "computer-readable medium," or similar phrases, then unless specifically stated otherwise it is intended to refer to embodiment that include a single device, embodiments in which data is distributed across multiple devices, and embodiments relating to various sectors of a single device. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system for determining a labor flexibility level for a document management system that meets a performance level of a full-flexibility level and is within one or more threshold limits, the system comprising:
    a document management system comprising a plurality of print production devices, wherein the document management system is associated with a plurality of operators who each possess one or more skill sets for operating one or more of the print production devices;
    an electronic device in communication with the document management system;
    a computer-readable storage medium comprising one or more programming instructions that, when executed cause the electronic device to:
        identify a fully-flexible configuration of the document management system as a current configuration, wherein the fully-flexible configuration represents a configuration where each of the plurality of operators possesses every skill set necessary to operate each print production device,
        determine a performance level value for the current configuration,
        identify a set of possible configurations of the document management system, wherein each possible configuration represents a configuration where one or more of the plurality of operators possesses fewer than every skill set,
        for each possible configuration in the set:
            select a possible configuration from the set,
            determine whether the selected possible configuration should replace the current configuration based on the performance level value associated with the current configuration, a performance level value associated with the selected possible configuration, and a performance threshold limit,
            in response to determining whether the selected possible configuration should replace the current configuration, replace the current configuration with the selected possible configuration, and
        present to a user the current configuration as a recommended configuration for the document management system, wherein the current configuration indicates which operators should be cross-trained with which skill sets.

2. The system of claim 1, wherein the one or more programming instructions that, when executed cause the electronic device to determine a fully-flexible performance level value for the fully-flexible configuration comprises one or more programming instructions that, when executed, cause the electronic device to perform a simulation of an operation of the current configuration using at least a portion of historical print job information.

3. The system of claim 1, wherein the one or more programming instructions that, when executed cause the electronic device to determine whether the selected possible configuration should replace the current configuration comprise one or more programming instructions that, when executed, cause the electronic device to:
  determine the performance value associated with the selected possible configuration;
  identify the performance threshold limit that represents a threshold value of one or more performance parameters;
  determine whether the performance value associated with the selected possible configuration does not exceed a sum of the performance level value associated with the current configuration and the performance threshold limit.

4. The system of claim 3, wherein the computer-readable storage medium further comprises one or more programming instructions that, when executed cause the electronic device to:
  in response to determining that the performance value associated with the selected possible configuration does not exceed a sum of the performance level value associated with the current configuration and the performance threshold limit:
    determine a cross-training cost associated with the current configuration,
    determine a cross-training cost associated with the selected possible configuration,
    determine a difference between the cross-training cost associated with the selected possible configuration and the cross-training cost associated with the current configuration, and
    in response to the difference being less than zero, determine that the selected possible configuration should replace the current configuration.

5. The system of claim 4, wherein the one or more programming instructions that, when executed, cause the electronic device to determine a cross-training cost associated with the current configuration comprise one or more programming instructions that, when executed, cause the electronic device to perform a simulation of an operation of the current configuration using at least a portion of historical print job information.

6. The system of claim 4, wherein the one or more programming instructions that, when executed, cause the electronic device to determine a cross-training cost associated with the selected possible configuration comprise one or more programming instructions that, when executed, cause the electronic device to perform a simulation of an operation of the selected possible configuration using at least a portion of historical print job information.

7. A method for determining a labor flexibility level for a document management system that meets a performance level of a full-flexibility level and is within one or more threshold limits, the method comprising:
  identifying, by an electronic device, a fully-flexible configuration of a document management system as a current configuration, wherein the document management system comprises a plurality of print production devices, wherein the document management system is associated with a plurality of operators who each possess one or more skill sets for operating one or more of the print production devices, wherein the fully-flexible configuration represents a configuration where each of the plurality of operators possesses every skill set necessary to operate each print production device;
  determining a performance level value for the current configuration;
  identifying a set of possible configurations of the document management system, wherein each possible configuration represents a configuration where one or more of the plurality of operators possesses fewer than every skill set;
  for each possible configuration in the set:
    selecting a possible configuration from the set,
    determining whether the selected possible configuration should replace the current configuration based on the performance level value associated with the current configuration, a performance level value associated with the selected possible configuration, and a performance threshold limit,
    in response to determining whether the selected possible configuration should replace the current configuration, replacing the current configuration with the selected possible configuration, and
    presenting to a user the current configuration as a recommended configuration for the document management system, wherein the current configuration indicates which operators should be cross-trained with which skill sets.

8. The method of claim 7, wherein determining a fully-flexible performance level value for the fully-flexible configuration comprises performing a simulation of an operation of the current configuration using at least a portion of historical print job information.

9. The method of claim 7, wherein determining whether the selected possible configuration should replace the current configuration comprises:
  determining the performance value associated with the selected possible configuration;
  identifying the performance threshold limit that represents a threshold value of one or more performance parameters; and
  determining whether the performance value associated with the selected possible configuration does not exceed a sum of the performance level value associated with the current configuration and the performance threshold limit.

10. The method of claim 9, further comprising:
  in response to determining that the performance value associated with the selected possible configuration does not exceed a sum of the performance level value associated with the current configuration and the performance threshold limit:
    determining a cross-training cost associated with the current configuration,
    determining a cross-training cost associated with the selected possible configuration,
    determining a difference between the cross-training cost associated with the selected possible configuration and the cross-training cost associated with the current configuration, and
    in response to the difference being less than zero, determining that the selected possible configuration should replace the current configuration.

11. The method of claim 10, wherein determining a cross-training cost associated with the current configuration comprises performing a simulation of an operation of the current configuration using at least a portion of historical print job information.

12. The method of claim 10, wherein determining a cross-training cost associated with the selected possible configuration comprises performing a simulation of an operation of the selected possible configuration using at least a portion of historical print job information.

\* \* \* \* \*